United States Patent
Gerlinger et al.

(10) Patent No.: US 11,431,086 B2
(45) Date of Patent: Aug. 30, 2022

(54) HEAT DISSIPATION FROM A MOBILE RADIO ANTENNA FOR CONNECTION TO AT LEAST ONE BASE STATION

(71) Applicant: Telefonaktiebolaget LM Ericsson (publ), Stockholm (SE)

(72) Inventors: Thomas Gerlinger, Rott am Inn (DE); Josef Fahrenschon, Rosenheim (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 95 days.

(21) Appl. No.: 17/058,359

(22) PCT Filed: May 22, 2019

(86) PCT No.: PCT/EP2019/063226
§ 371 (c)(1),
(2) Date: Nov. 24, 2020

(87) PCT Pub. No.: WO2019/224254
PCT Pub. Date: Nov. 28, 2019

(65) Prior Publication Data
US 2021/0203061 A1    Jul. 1, 2021

(30) Foreign Application Priority Data

May 24, 2018 (DE) ............... 20 2018 102 912.6

(51) Int. Cl.
*H01Q 1/24* (2006.01)
*H01Q 1/02* (2006.01)
(Continued)

(52) U.S. Cl.
CPC ............ *H01Q 1/246* (2013.01); *H01Q 1/02* (2013.01); *H01Q 1/42* (2013.01); *H01Q 15/14* (2013.01); *H04W 88/08* (2013.01)

(58) Field of Classification Search
CPC ............ H01Q 1/246; H01Q 1/02; H01Q 1/42; H01Q 15/14
(Continued)

(56) References Cited

U.S. PATENT DOCUMENTS 7,043,280 B1*  5/2006 Shields ............... H01Q 1/246
                                                  343/702
7,382,329 B2*  6/2008 Kim .................... H01Q 1/246
                                                  343/757
(Continued)

FOREIGN PATENT DOCUMENTS

DE   102016112701 A1   1/2018
DE   102016115099 A1   2/2018

OTHER PUBLICATIONS

International Search Report and Written Opinion for International Patent Application No. PCT/EP2019/063226, dated Aug. 19, 2019, 15 pages.
(Continued)

*Primary Examiner* — Lam T Mai
(74) *Attorney, Agent, or Firm* — Withrow & Terranova, PLLC

(57) ABSTRACT

A mobile communication antenna comprises a radome, a reflector arrangement, mobile communication radiators, and at least one electronic module. The radiators are arranged on a front side and the at least one electronic module is arranged on a rear side of the reflector arrangement. At least one electronic module comprises an electronic unit and a module housing within which the electronic unit is arranged. The module housing is made of metal and comprises a front side, a rear side, end faces and side walls, wherein the front side of the module housing points in the direction of the radome and the rear side of the module housing points in the direction of the rear side of the reflector arrangement. At
(Continued)

Figure 1:
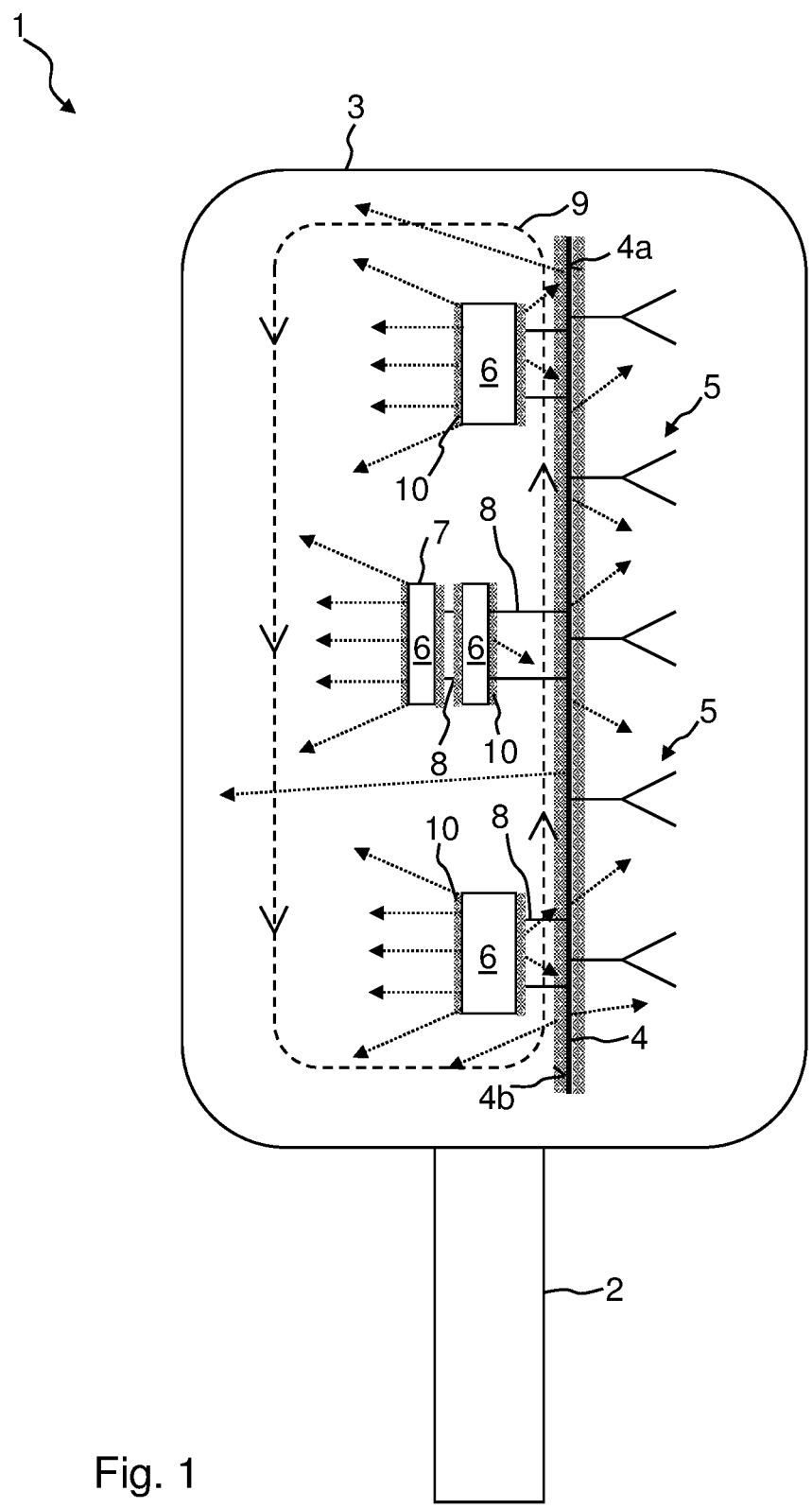

least the surface of the front side and/or the rear side of the module housing is at least predominantly coated with a heat emission layer.

20 Claims, 2 Drawing Sheets

(51) Int. Cl.
      *H01Q 1/42*       (2006.01)
      *H01Q 15/14*     (2006.01)
      *H04W 88/08*    (2009.01)

(58) Field of Classification Search
     USPC ........................................................ 343/834
     See application file for complete search history.

(56) References Cited

U.S. PATENT DOCUMENTS

| | | | |
|---|---|---|---|
| 2016/0381827 A1* | 12/2016 | Morse | H05K 9/0081 |
| | | | 361/699 |
| 2018/0351248 A1* | 12/2018 | Kim | H01Q 1/1264 |
| 2020/0102080 A1* | 4/2020 | Cuenca | H01M 50/375 |
| 2020/0106067 A1* | 4/2020 | Russell | H01M 50/35 |

OTHER PUBLICATIONS

Written Opinion for International Patent Application No. PCT/EP2019/063226, dated Jul. 6, 2020, 6 pages.

International Preliminary Report on Patentability for International Patent Application No. PCT/EP2019/063226, dated Aug. 21, 2020, 44 pages.

* cited by examiner

HEAT DISSIPATION FROM A MOBILE RADIO ANTENNA FOR CONNECTION TO AT LEAST ONE BASE STATION

This application is a 35 U.S.C. § 371 national phase filing of International Application No. PCT/EP2019/063226, filed May 22, 2019, which claims the benefit of German Patent Application No. 20 2018 102 912.6, filed May 24, 2018, the disclosures of which are incorporated herein by reference in their entireties.

The invention is related to an improved heat dissipation of a mobile communication antenna for connecting to at least one base station. Such a mobile communication antenna is usually mounted on a mast or on a wall and is used for communication with mobile devices such as smartphones.

Due to the fact that more and more mobile communication bands have to be supported, the integration density inside the mobile communication antenna increases. They are also operated with increasingly higher transmission powers, so that higher power losses occur. In addition, the antennas are usually installed at prominent positions that are directly affected by solar radiation. This increases the temperature inside the mobile communication antenna. It is also problematic that an increased temperature leads to increased attenuation, which in turn leads to increased power dissipation, wherein the temperature is further increased. For safe operation, heat energy must be dissipated. Therefore, cooling of the components within the mobile communication antenna is becoming more and more important.

At present, cooling is mainly done by heat convection or heat conduction. In order to achieve cooling via heat conduction, the heat source is connected to a heat sink via a heat conductor. The heat transfer resistances should be as low as possible and the thermal conductivity as high as possible. For cooling by means of heat convection, air streams inside the mobile communication antenna are used. Warm air inside the mobile communication antenna rises to the top where it cools down and then sinks again. This creates an air circulation which serves to cool the components inside the mobile communication antenna.

The U.S. Pat. No. 7,043,280 B1 describes an antenna, which has several radiating elements, which are arranged on one side of a reflector. On the rear side of the reflector are active components which generate heat loss. To dissipate this heat efficiently, the housing is divided into two parts. A first housing part is made of metal and a second housing part is the radome. The first part of the housing is located on the rear side of the reflector in such a way that the active components can transfer their heat loss to the first part of the housing by means of heat conduction. The first housing part has a heat emission layer on the outside and a heat absorption layer on the inside.

The disadvantage of the primarily used cooling methods is that they are more and more often reaching their limits. If the mobile communication antennas are very densely packed, then heat dissipation via heat convection brings an ever worse result. Also, it is often not possible to connect the heat sources to the heat sinks because this increases intermodulation problems or because the heat sink would have to be cooled as well.

It is therefore the object of the present invention to ensure improved heat dissipation from those components in which a lot of heat loss occurs.

The object is solved by the mobile communication antenna of the independent claim 1. In the dependent claims advantageous embodiments of the mobile communication antenna are shown.

The mobile communication antenna according to the invention comprises a radome, a reflector arrangement (single-piece or multiple-piece), a plurality of mobile communication radiators and at least one or more electronic modules (heat sources). The reflector arrangement, the plurality of mobile communication radiators and the at least one or more electronic modules are arranged inside the radome. The radome comprises a front wall, a rear wall and side walls. The plurality of mobile communication radiators are arranged on a front side of the reflector arrangement and the at least one or more electronic modules are arranged on a rear side of the reflector arrangement. The reflector arrangement consists of an electrically conductive material, in particular a metal such as aluminum for example. At least one of the several electronic modules comprises an electronic unit and a module housing. The electronic unit is located in the module housing. The module housing of at least one electronic module is made of metal or a metal alloy and comprises a front side, a rear side, end faces and side walls. The front side of the module housing of the at least one electronic module points towards the rear wall of the radome, whereas the rear side of the module housing of the at least one electronic module is opposite the front side of the module housing of the at least one electronic module and points towards the front wall of the radome. At least the surface of the front side and/or the surface of the rear side of the module housing is/are at least predominantly coated with a heat emission layer. This comprises an emissivity ε, with ε≥0.6.

It is particularly advantageous that the surface of the module housing which comprises metal or metal alloy is additionally coated. Extensive investigations and tests have shown that the overall heat dissipation of the mobile communication antenna is significantly improved by an improved emission of thermal radiation.

Further investigations have shown that the use of a lacquer, which forms the heat emission layer, produces particularly good results. This is especially true if the lacquer is a wrinkle paint, which can also be described as shrink paint. After drying, such a lacquer leaves behind an inhomogeneously very rough surface or a hill-and-dale structure, whereby the surface area is increased on the one hand and emission takes place in a plurality of directions on the other hand. By the use of an appropriate wrinkle paint, the emission characteristics in the infra-red range are increased too, because such a wrinkle paint comprises clearly better radiation characteristics and comes closer to a black radiator than a (bright) metal surface.

Figure 2:
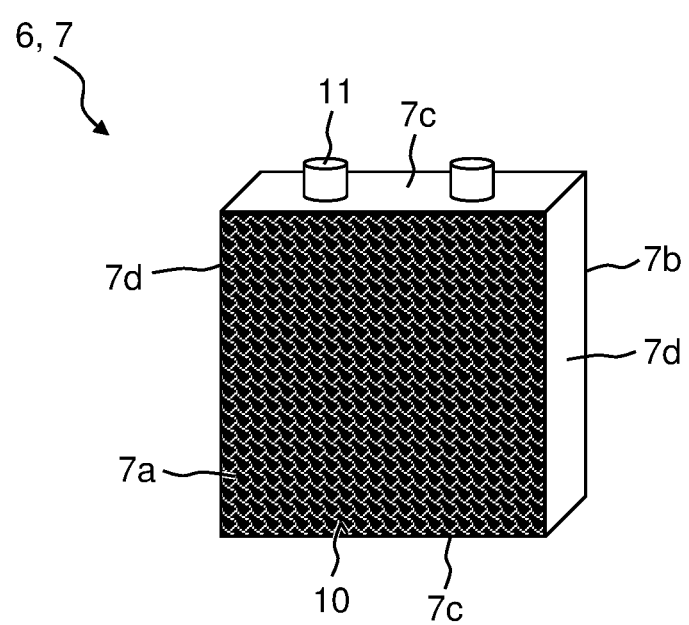

Various embodiments of the invention are described below with reference to the drawings. The same subject-matter has the same reference signs. The corresponding figures of the drawing show in detail:

FIG. 1: a longitudinal section through a mobile communication antenna according to the invention; and FIG. 2: an embodiment of an electronic module.

FIG. 1 shows a longitudinal section through a mobile communication antenna 1 according to the present invention, which is attached to an antenna mast 2. The mobile communication antenna 1 comprises a radome 3, a reflector arrangement 4, a plurality mobile communication radiators 5 and in this case a plurality electronic modules 6. All these components are completely arranged inside the radome 3. The mobile communication radiators 5 are arranged on a front side 4a of the reflector arrangement 4. The electronic modules 6, however, are arranged on a rear side 4b of the reflector arrangement 4. The electronic modules 6 are for example a combiner and/or a splitter and/or a phase shifter and/or a shielding cover and/or a power supply unit and/or a motor. The electronic modules 6 represent a heat source. This means that they heat up during operation of the mobile communication antenna 1 and that, depending on the operating conditions, it may be necessary to dissipate at least a certain amount of heat energy to ensure cooling and thus further safe operation of the respective electronic module 6.

One way to dissipate the excess heat energy is through heat conduction. This could be achieved by arranging the electronic modules 6 directly on the rear side 4b of the reflector arrangement 4 with the lowest possible heat transfer resistance. However, since at least one electronic module 6 comprises a module housing 7, which consists in particular of metal or a metal alloy such as aluminum, the electrical properties of the mobile communication antenna 1 would deteriorate if the electronic modules 6 were directly connected, e.g. if the electronic modules 6 were placed or screwed directly onto the rear side 4b of the reflector arrangement 4. In particular, additional intermodulation would occur.

For this reason, the electronic modules 6 are attached to the reflector arrangement 4 at a distance via spacers 8. These spacers 8 preferably consist of a dielectric material. Although this is advantageous with regard to the electrical properties of the mobile communication antenna, the heat transfer resistance is poor, so that mere cooling via thermal conduction is no longer possible. Also shown is that several electronic modules 6 are also arranged on top of each other (horizontally spaced) by means of spacers 8. These spacers 8 consist of a dielectric. This dielectric has, for example, a thermal conductivity of less than 6 W/mK.

Therefore, nowadays cooling is mainly done by heat convection. This means that the electronic modules 6 are cooled by an air stream 9. Because the electronic modules 6 are usually arranged one above the other (vertically spaced) at the rear side 4b of the reflector arrangement 4, the air stream 9 is established, which extends from the lower area, i.e. the bottom area of radome 3, towards the upper end area of radome 3. The air stream 9 is shown as a dashed line (-----) in FIG. 1. At the upper end of radome 3 the air cools down again and sinks near the radome side walls or the radome rear wall towards the lower end area. However, since the receiving room of the mobile communication antenna 1 is nowadays packed more and more densely with components, including cables, the heat extraction, i.e. the cooling of the electronic modules 6 via heat convection, is also limited. Therefore, many manufacturers use active ventilation systems, i.e. electrically driven fans. These fans are also susceptible to failure and expensive to install and are difficult to replace in case of failure. In contrast, the mobile communication antenna 1 according to the present invention does not need such active fans. In particular, no such fans are arranged on or screwed to the electronic modules 6.

It is not shown that the electronic modules 6 have an electronic unit which is responsible for the heating during operation, whereby this electronic unit is surrounded by the module housing 7. Such an electronic module 6 is shown with its module housing 7 in FIG. 2. The module housing 7 comprises a front side 7a, a rear side 7b, end faces 7c and side walls 7d. The front side 7a points in particular in the direction of the radome 3. The rear side 7b points in the direction of the rear side 4b of the reflector arrangement 4. The front side 7a and the rear side 7b preferably run parallel to each other and further preferably parallel to the rear side 4b of the reflector arrangement 4. These sides may also have a corrugated structure or grooves that extend vertically when the electronic module 6 is mounted.

The surface of the front side 7a corresponds approximately to the surface of the rear side 7b. The surface of the front side 7a or the rear side 7b is/are preferably larger than the surfaces of the end face 7c or the side wall 7b alone or in combination.

The module housing 7 preferably consists of two housing halves that are screwed or clipped together.

To ensure good shielding of the electronic unit in the module housing 7, the module housing 7 is made of metal (especially aluminum) or a metal alloy. A heat transfer resistance between such a module housing 7 and the reflector arrangement 4 would be low if the module housing 7 was mounted directly on the reflector arrangement 4. However, as already explained, this would deteriorate the electrical properties of the mobile communication antenna 1.

For this reason, at least the surface of the front side 7a and/or the rear side 7b of the module housing 7 of the at least one electronic module 6 according to the invention is at least predominantly coated with a heat emission layer 10. This heat emission layer 10 has an emissivity $\varepsilon$ of $\varepsilon \geq 0.6$. This heat emission layer 10 causes heat dissipation to be increased also by heat emission. Such heat emission is shown in FIG. 1 by dotted arrows ( . . . ).

This heat emission layer 10 should come as close as possible to a black radiator. Preferably, more than 50%, 60%, 70%, 80% or 90% of the surface of at least the front side 7a and/or the rear side 7b of the module housing 7 are coated. A complete coating would also be possible.

It would also be possible that the end faces 7c and/or the side walls 7d of the module housing 7 are also partially, predominantly or completely coated with the heat emission layer 10.

The same can also be true for the front side 4a and/or the rear side 4b of the reflector arrangement 4.

It is also possible that at least one or more partial areas of the surface of the front side 7a and/or the rear side 7b of the module housing 7 are excluded from the coating with the heat emission layer 10. In particular, these are those partial areas whose temperature is below a temperature threshold value during normal operation. This could be determined by simulation. In particular, the heat emission layer 10 should be applied to those areas where "hotspots" are formed.

The inner side of the module housing 7 could also be completely or predominantly coated with such a heat emission layer 10.

By using such a heat emission layer 10, heat dissipation of the at least one electronic module 6 takes place to more than 40%, 50%, 60% or 70% via emission radiation.

Preferably at least one module housing 7 is an extruded part. It could also be a casted part, sheet metal part or otherwise manufactured part.

More preferably, the emissivity E is more than 0.65 or 0.7 or 0.75 or 0.8 or 0.85 or 0.9 or 0.95 or 0.97 or more than 0.98.

Preferably, the heat emission layer 10 is formed by a lacquer. This lacquer is in particular a spray lacquer. Preferably, it is a wrinkle paint. The lacquer could also be applied with a brush, by powder coating or by dipping the module housing 7 into a lacquer bath.

The lacquer comprises a hill-and-dale structure with different layer thicknesses. Whereby a difference between a layer of lower thickness and a layer of higher thickness is preferably larger than 70 µm or 100 µm.

FIG. 2 shows a heat emission layer 10 in the form of a lacquer. This layer is structured. The thickness of the heat emission layer 10 is preferably greater than 100 µm, 150 µm, 200 µm, 250 µm, 300 µm but preferably less than 500 µm, 450 µm, 400 µm, 350 µm, 300 µm or less than 250 µm. The heat emission layer 10 can consist of several lacquer layers.

The lacquer is preferably dried at a temperature of 60° C., 70° C., 80° C., 90° C. but further preferably below 140° C., 130° C., 120° C. However, the lacquer can also be dried at room temperature.

The lacquer is preferably applied to a smooth surface of the front side 7a and/or the rear side 7b of the module housing 7. The class of roughness is preferably lower than N11.

In principle, the heat emission layer 10 could also be formed by a powder coating. The heat emission layer 10 could also be formed by an electroplating process and comprise or consist of an anodized layer.

The heat emission layer 10 could also be formed by a sticker unit. On this sticker unit preferably another color and/or a wrinkle paint is applied.

The heat emission layer 10 preferably contains color components and is especially black.

The heat emission layer 10 is preferably electrically non-conductive.

The module housing 7 of at least one electronic module 6 is preferably electrically isolated from the reflector arrangement 4.

Everything described for at least one electronic module 6 can also apply to all electronic modules 6.

In FIG. 2, connections 11 are also shown to connect the electronic module 6 with other components. For better clarity, the figures do not show the corresponding cables.

In the following, some advantages of the mobile communication antenna 1 according to the invention are emphasized again separately.

An advantage of the mobile communication antenna 1 is present, if it comprises the following feature:
the emissivity ε is ≥0.65 or ≥0.7 or ≥0.75 or ≥0.8 or ≥0.85 or ≥0.9 or ≥0.95 or ≥0.97 or ≥0.98.

An advantage of the mobile communication antenna 1 is present, if it comprises the following feature:
the lacquer is dried at a temperature of more than 70° C.

An advantage of the mobile communication antenna 1 is present, if it comprises the following feature:
the lacquer is dried at room temperature, especially at 23° C.

An advantage of the mobile communication antenna 1 is present, if it comprises the following feature:
the heat emission layer 10 is formed by a powder coating.

An advantage of the mobile communication antenna 1 is present, if it comprises the following feature:
the sticker unit is provided with the lacquer.

An advantage of the mobile communication antenna 1 is present, if it comprises the following feature:
the heat emission layer 10 has color components and is especially black.

An advantage of the mobile communication antenna 1 is present, if it comprises the following feature:
the module housing 7 of the at least one electronic module 6 is galvanically isolated from the reflector arrangement 4.

An advantage of the mobile communication antenna 1 is present, if it comprises the following feature:
the front side 7a and the rear side 7b of the module housing 7 of the at least one electronic module 6 run parallel to each other and parallel to the reflector arrangement.

An advantage of the mobile communication antenna 1 is present, if it comprises the following feature:
the front side 7a and the rear side 7b of the module housing 7 of the at least one electronic module 6 run parallel to each other and perpendicular to the reflector arrangement.

An advantage of the mobile communication antenna 1 is present, if it comprises the following feature:
the front side 7a and the rear side 7b of the module housing 7 of the at least one electronic module 6 extend slantwise to each other and slantwise to the reflector arrangement.

An advantage of the mobile communication antenna 1 is present, if it comprises the following feature:
the module housing 7 of the at least one electronic module 6 consists of or comprises:
a) aluminium; and/or
b) magnesium; and/or
c) copper; and/or
d) brass; and/or
e) stainless steel; and/or
f) zinc; and/or
g) steel; and/or
h) cast iron; and/or
i) cast steel; and/or
j) titanium; and/or
k) metallized plastic; and/or
l) metallized thermoset.

An advantage of the mobile communication antenna 1 is present, if it comprises the following feature:
the at least one electronic module 6 is a heat source.

The invention is not limited to the embodiments described. Within the scope of the invention, all described and/or drawn features can be combined with each other in any way.

The invention claimed is:

1. A mobile communication antenna for connecting to at least one base station, comprising the following features:
a radome, a reflector arrangement, a plurality of mobile communication radiators and at least one or more electronic modules are provided;
the radome comprises a front wall, a rear wall and side walls;
the reflector arrangement, the plurality of mobile communication radiators and the at least one or more electronic modules are arranged inside the radome;
the plurality of mobile communication radiators are arranged on a front side of the reflector arrangement;
the at least one or more electronic modules are arranged on a rear side of the reflector arrangement;
at least one electronic module comprises an electronic unit and a module housing, the electronic unit being arranged in the module housing;
the module housing of the at least one electronic module is made of metal or a metal alloy and comprises a front side, a rear side, end faces and side walls, wherein the front side of the module housing of the at least one electronic module points in the direction of the rear wall of the radome and the rear side of the module housing of the at least one electronic module is opposite the front side of the module housing of the at least one electronic module and points towards the front wall of the radome;
at least the surface of the front side and/or the rear side of the module housing of the at least one electronic module is at least predominantly coated with a heat emission layer which has an emissivity ε, with ε≥0.6.

2. The mobile communication antenna according to claim 1, characterized by the following feature:
the heat emission layer is formed by a lacquer or
the heat emission layer is formed by spray lacquer; or
the heat emission layer is formed by wrinkle paint.

3. The mobile communication antenna according to claim 2, characterized by the following feature:
   the lacquer comprises a hill-and-dale structure with different layer thicknesses, wherein a difference between a layer with lower thickness and a layer with higher thickness is greater than 100 μm.

4. The mobile communication antenna according to claim 2, characterized by the following feature:
   a layer thickness of the heat emission layer is greater than 100 μm or 150 μm or 200 μm or 250 μm or 300 μm but preferably less than 500 μm or 450 μm or 400 μm or 350 μm or 300 μm or 250 μm.

5. The mobile communication antenna according to claim 2, characterized by the following feature:
   the heat emission layer consists of several layers of lacquer.

6. The mobile communication antenna according to claim 2, characterized by the following feature:
   the surface of at least the front side and/or the rear side of the module housing of the at least one electronic module below the heat emission layer is smooth, wherein the class of roughness is preferably smaller than N11.

7. The mobile communication antenna according to claim 1, characterized by the following feature:
   the heat emission layer is a sticker unit.

8. The mobile communication antenna according to claim 1, characterized by the following feature:
   the heat emission layer is an anodized layer.

9. The mobile communication antenna according to claim 1, characterized by the following feature:
   the heat emission layer is electrically non-conductive.

10. The mobile communication antenna according to claim 1, characterized by the following feature:
    at least one spacer is provided, wherein the at least one spacer is arranged between the module housing of the at least one electronic module and the reflector arrangement, whereby the module housing of the at least one electronic module is arranged at a distance from the reflector arrangement;
    the at least one spacer consists of a dielectric and has a thermal conductivity of less than 6 W/mK.

11. The mobile communication antenna according to claim 1, characterized by the following feature:
    at least a part of the module housing of the at least one electronic module is an extruded part or a cast part.

12. The mobile communication antenna according to claim 1, characterized by the following feature:
    the at least one electronic module is fanless; and/or the mobile communication antenna is fanless; or
    the mobile communication antenna comprises one or more fans.

13. The mobile communication antenna according to claim 1, characterized by the following feature:
    more than 50%, 60%, 70%, 80%, 90% of the surface of at least the front side and/or the rear side of the module housing of the at least one electronic module is/are coated with the heat emission layer.

14. The mobile communication antenna according to claim 1, characterized by the following feature:
    at least one partial area of the surface of the front side and/or the rear side of the module housing of the at least one electronic module is excluded from the coating with the heat emission layer, wherein the at least one partial area is that whose temperature is below a temperature threshold value during normal operation.

15. The mobile communication antenna according to claim 1, characterized by the following feature:
    the front side and/or the rear side of the module housing of the at least one electronic module is/are completely coated with the heat emission layer.

16. The mobile communication antenna according to claim 1, characterized by the following feature:
    the end faces and/or the side walls of the module housing of the at least one electronic module are partially, predominantly or completely coated with the heat emission layer.

17. The mobile communication antenna according to claim 1, characterized by the following feature:
    inner sides of the module housing of the at least one electronic module are predominantly or completely free of a heat emission layer; or
    inner sides of the module housing of the at least one electronic module are predominantly or completely coated with the heat emission layer.

18. The mobile communication antenna according to claim 1, characterized by the following feature:
    the front side and/or rear side of the reflector arrangement is/are partially, predominantly or completely coated with a heat emission layer.

19. The mobile communication antenna according to claim 1, characterized by the following feature:
    a heat dissipation of the at least one electronic module is achieved by more than 40% or 50% or 60% or 70% via emission radiation.

20. The mobile communication antenna according to one of the preceding claim 1, characterized by the following feature:
    the at least one electronic module is a combiner or a splitter or a phase shifter or a shielding cover or a power supply unit or a motor or a power splitter or a bias tee or a filter.

* * * * *